United States Patent [19]

Albert

[11] Patent Number: 4,804,875
[45] Date of Patent: Feb. 14, 1989

[54] MONOLYTHIC RESONATOR VIBRATING BEAM ACCELEROMETER

[75] Inventor: William C. Albert, Boonton, N.J.

[73] Assignee: The Singer Company, Stamford, Conn.

[21] Appl. No.: 418,930

[22] Filed: Sep. 16, 1982

[51] Int. Cl.$^4$ .................................... H01L 41/00
[52] U.S. Cl. ................................ 310/323; 310/321; 73/517 AV
[58] Field of Search ............... 73/517 AV, DIG. 1; 310/321, 323, 329

[56] References Cited

U.S. PATENT DOCUMENTS

| | | | |
|---|---|---|---|
| 3,470,400 | 9/1969 | Weisbord | 73/DIG. 1 |
| 3,505,866 | 4/1970 | Weisbord et al. | 73/DIG. 1 |
| 4,104,920 | 8/1978 | Albert et al. | 73/517 AV |
| 4,221,131 | 9/1980 | Albert | 73/517 AV |
| 4,445,065 | 4/1984 | Albert | 310/323 |
| 4,446,394 | 5/1984 | Albert | 310/323 |
| 4,538,461 | 9/1985 | Juptner et al. | 310/321 |
| 4,658,175 | 4/1987 | Albert | 310/326 |

Primary Examiner—Nelson Moskowitz
Attorney, Agent, or Firm—David L. Davis

[57] ABSTRACT

In order to implement a vibrating beam accelerometer, preferably in a dual beam configuration, a monolithic piezoelectric structure which includes at least a first mounting surface, a second mounting surface spaced therefrom and between the mounting surfaces and coupled thereto a vibrating beam, is provided. The two mounting surfaces are connected to each other by flexures so that relative movement between them is possible. This structure results in a closed path from mounting surface to vibrating beam to mounting surface avoiding problems present in prior art devices in which there were joints at three different points within the closed path.

9 Claims, 3 Drawing Sheets

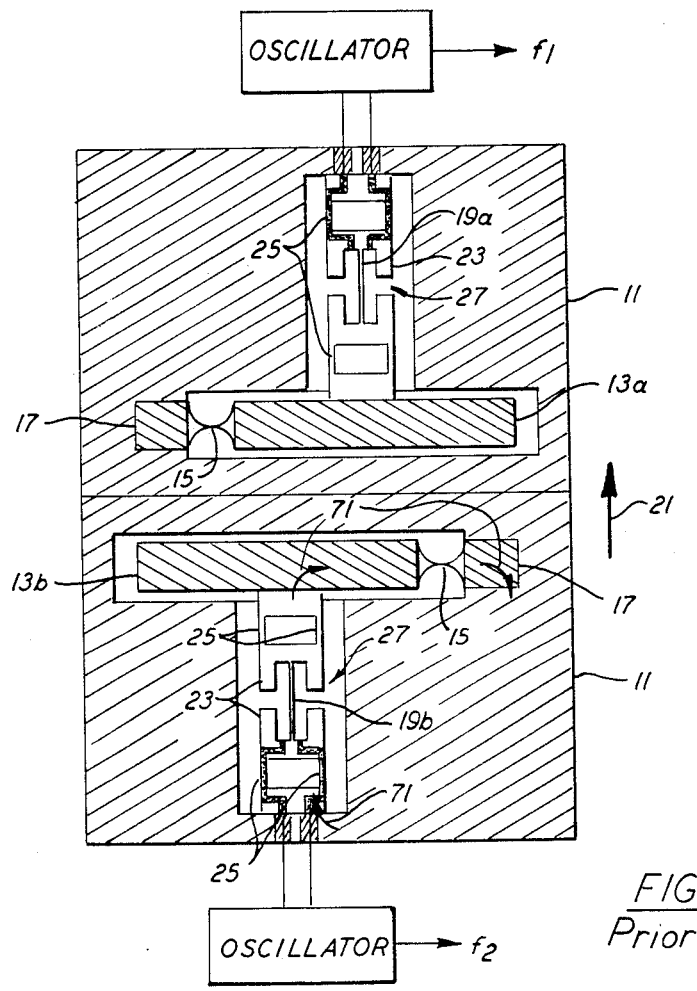
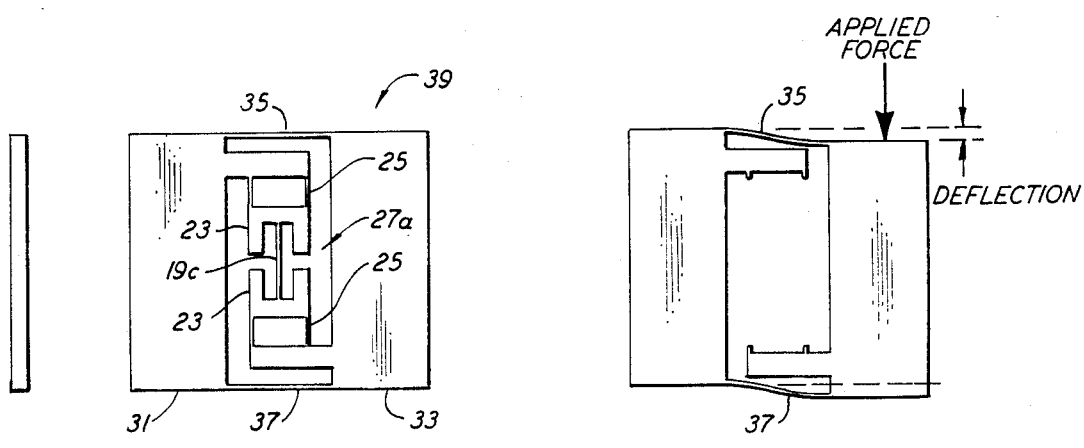
FIG. 1 Prior Art
FIG. 3  FIG. 2  FIG. 4

MONOLYTHIC RESONATOR VIBRATING BEAM ACCELEROMETER

BACKGROUND OF THE INVENTION

This invention relates to accelerometers, in general, and more particularly to an improved resonator vibrating beam accelerometer which is of a monolithic construction.

Vibrating beam accelerometers have found widespread use in aircraft navigation systems. In a vibrating beam accelerometer, a proof mass is supported by a beam. This beam is caused to vibrate by exciting piezoelectric beam material with an oscillator circuit. In an axially unstressed condition, the beam has a certain natural frequency of vibration, determined primarily by its dimensions, the material of which it is made, temperature and the medium in which it is operating. In response to an axial stress applied to the beam, the natural frequency of vibration changes, the frequency increasing in response to axial tension and decreasing in response to axial compression. Such a vibrating beam accelerometer is described in U.S. Pat. No. 3,470,400. The device disclosed therein is a single beam device.

Although this worked reasonably well, it was discovered that there were advantages to utilizing two beams, one of which would be stressed in compression and one in tension. In such a case, two beams and two proof masses are arranged so that an input acceleration places one beam in tension and the other in compression. The output is then taken as the difference frequency between the two beams. Such an arrangement is disclosed in U.S. Pat. No. 3,479,536. The two beam mechanization is described by the following equations: Note that these equations express the frequency behavior of the individual beams as a power series. The $K_o$ terms are individual resonator bias (no load) frequency terms and the $K_1$, $K_2$, $K_3$ are respectively the first, second and third order acceleration-frequency (a-f) sensitivities.

BEAM 1 OUTPUT (beam in tension)

$$f_1 = K_{01} + K_{11}a + K_{21}a^2 + K_{31}a^3 \ldots \quad (1)$$

BEAM 2 OUTPUT (Beam in compression)

$$f_2 = K_{02} - K_{12}a + K_{22}a^2 - K_{32}a^3 \ldots \quad (2)$$

DIFFERENCE FREQUENCY OUTPUT

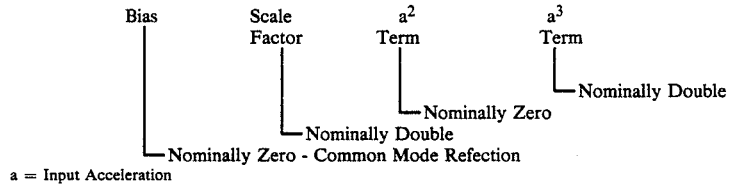

$$f_1 - f_2 = (K_{01} - K_{02}) + (K_{11} + K_{12})a + (K_{21} - K_{22})a^2 + (K_{31} + K_{32})a^3 \quad (3)$$

a = Input Acceleration

The advantages which the dual beam push-pull mechanization gives includes the following:

The difference frequency and, hence, accelerometer bias, is low, the tolerance on the match of the individual beam bias $K_o$ will determine the difference bias. The scale factor will be twice that of the individual beam scale factor. The difference frequency $a^2$ term is nominally zero to reduce vibration effects and increase linearity.

The diference frequency $a^3$ term is nominally doubled, however, this term is small.

Differencing results in common mode rejection to greatly reduce thermal effects.

The common mode rejection obtained by differencing greatly reduces the effect of bias error sources that affect both the individual beams in a similar manner, such as thermal effects and aging. Thus, for all of these reasons, a dual beam mechanization which uses the difference frequency between one beam in tension and the other beam in compression is an essential requirement in a vibrating beam accelerometer to meet present-day requirements.

FIG. 1 shows a prior art vibrating beam accelerometer having one beam in tension and one beam in compression. There is thus, for each of the two accelerometer portions a housing 11. Within each housing is a proof mass 13 supported by a flexure 15 with the other side of the flexure having a part 17 embedded into the housing 11. The proof masses 13a and 13b are supported, respectively, by beams 19a and 19b. Beam 19a is in tension for an input acceleration in the direction of arrow 21, and beam 19b in compression. The structure which includes the beam is a piezoelectric structure and also includes on each end of the beam an isolator mass 23 and a pair of isolator springs 25. One end of the beam structure, indicated generally as 27, is connected to the housing 11 and the other end to the proof mass 13a or 13b. This, then, is the general arrangement of the prior art type device. The problem with this device is that there are a total of three joints needed to make the assembly. There is the joint between the beam structure 27 and the housing 11, the joint between this structure 27 and the proof mass 13a or 13b and the joint between the proof mass part 17 and the housing 11. Typically, in the prior art, both the housing 11 and proof mass 13a or 13b are made of metal and the structure 27, of quartz. The joints between the resonator and housing and resonator and proof mass are made using an epoxy. This epoxy has a relatively large thermal expansion coefficient compared to that of the metal pieces. Because of this difference in thermal expansion coefficient, stresses occur in the joints when the parts experience a temperature change. The epoxy, being an inorganic material, responds to these stresses by exhibiting plastic-like strains. These plastic-like strains may take place over a long periods of time and result in a creep type of behavior of the joint. This joint creep instability results in minute geometrical relationship changes between the quartz resonator and metal parts. This in turn, changes the boundary conditions of the vibrating beam, which results in a change in bias (no load) frequency. The changes in boundary condition enhanced frequency must be limited to on the order of a few parts in $10^9$ for the accelerometer to have good bias stability. Due to the creep instability of the joints, the vibrating beam accelerometer experiences undesirable bias strains over a period of time.

It is, thus, the object of the present invention to overcome these difficulties by providing a dual beam vibrating beam accelerometer which has a monolithic resonator and proof mass flexure, monolithic meaning that the resonator and flexure will be made of a single piece of quartz, thereby avoiding the joints which are the cause of the creep problem in the prior art.

BRIEF DESCRIPTION OF THE DRAWINGS

FIG. 1 is a view of a prior art dual beam vibrating accelerometer.

FIG. 2 is a plan view of a first type of monolithic resonator and flexure according to the present invention.

FIG. 3 is a side view of the monolithic resonator and flexure of FIG. 2.

FIG. 4 is a view of the monolithic and flexure showing a deflection.

DETAILED DESCRIPTION

Figure 5:
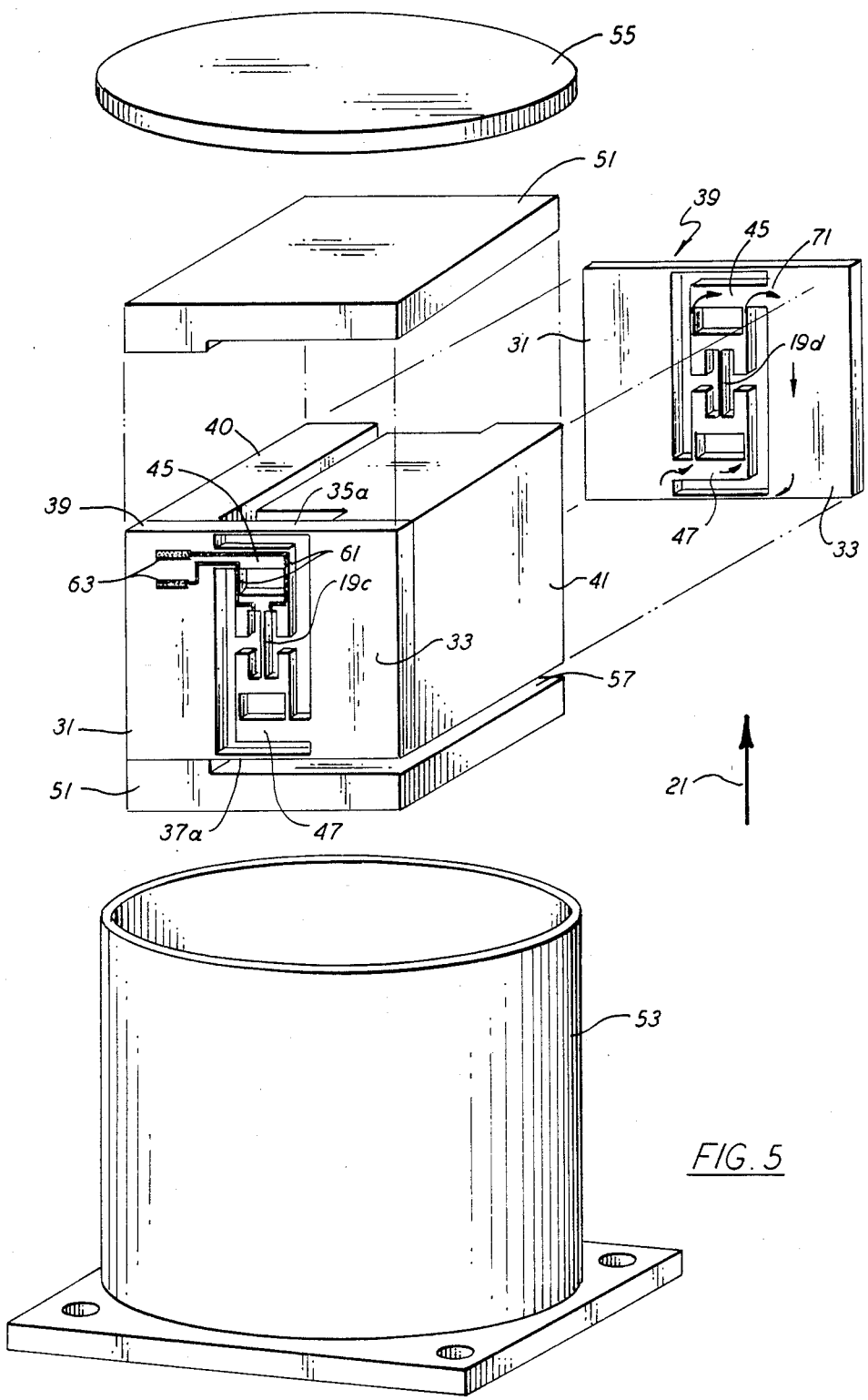
FIG. 5 is a perspective view showing the manner in which a proof mass is connected to a pair of resonator and flexure assemblies according to FIG. 3, and also showing the manner in which the accelerometer is placed in a housing.

FIG. 2 is a plan view and FIG. 3 a side view of a first type of monolithic resonator and flexure structure. Parts which are essentially identical to those of FIG. 1 will be given same reference numerals. In a monolithic structure of a piezoelectric material, there are formed two mounting surfaces 31 and 33 on opposite sides of a vibrating beam structure 27a of design quite similar to that of the structure 27 of FIG. 1. Thus, this structure includes isolator masses 23, the vibrating beam 19c, the isolation springs 25. It also includes two flexure beams 35 and 37. The manner in which the beams 35 and 37 bend with an applied force is illustrated by FIG. 4. There it can be seen that the mounting surface 33 is displaced with respect to the mounting surface 31. Referring, now, to FIG. 5, it can be seen how two monolithic structures 39 of the type shown in FIG. 2 are secured to a spacer or body part 40, the spacer or base 40 attaching to the mounting surface 31 of each of the monolithic structures 39. A proof mass 41 is secured to the surfaces 33. Also note, that the orientation of the two members 39 is opposite. Thus, with an input acceleration in the direction of arrow 21, one of the beams experiences tension while the other experiences compression. Note that in essence, the beam 19c is connected through an arm 45 to the spacer 40 in a rigid manner. Similarly, it is connected through an arm 47 rigidly to the proof mass 41. Thus, as the flexure beams 35a and 37a flex, proof mass 41 will tend to move downward and with it the surface 33 and through the arm 47 place tension force on the beam 19c. Considering the type of deflection shown in FIG. 4, it is apparent that virtually all the load is taken up by the vibrating beam, which is the desired condition. At the other end, the beam 19d is stressed in compression. Here, the top arm 45 rigidly couples the beam 19d to the proof mass 41 while the bottom arm 47 rigidly couples the beam to the spacer 40. Now as the proof mass and with it the mounting surface 33 move downward the beam 19d will be stressed in compression.

Therefore, when the proof mass 41 experiences an input acceleration, the resulting forces are shared by the two beams and, because of the resonator orientation, one vibrating beam experiences tension while the other experiences compression.

Attached to the top of spacer 40 and to the bottom spacer 40 is a damping plate 51. When mounted in a housing 53 with a sealed cover 55, therein, and the housing filled with an appropriate gas, the gas fills a damping gap 57 formed between the proof mass and the damping plates 51. The result is a conventional squeeze film gas damping mechanism of axial motion of the proof mass motion relative to the case.

FIG. 5 also illustrates metallized conductor areas 61 which form the piezoelectric drive electrodes. These terminate in contact areas 63 for connection to an oscillator. This portion of the system, which is similar to that described in the aforementioned U.S. Pat. Nos. 3,470,400 and 3,479,536 will not be described in detail here.

With the construction shown in FIG. 5, there are no joints between the internal resonator structure and the spacer (which is rigidly coupled to the housing) or between this structure and the proof mass. The closed path from mounting surface to resonator to mounting surface is all one monolithic piece of quartz. This closed path shown by the arrows 71 of FIG. 5 can be compared with similar arrows 71 in FIG. 1. Note that the three joints present in FIG. 1 are not present in, FIG. 5. At each of the locations, the structure is monolithic. The closed path is from mounting surface to resonator to mounting surface. The housing or spacer 40 and proof mass 41 are then in turn attached to the mounting surfaces 31 and 33 and are therefore not included in the closed path. A further feature of the embodiment of FIG. 5 is that only a single proof mass is utilized, giving a smaller size and lower cost for the accelerometer. In addition, the smaller size and closer resonator to resonator proximity results in lower thermal gradients between resonators and hence reduces thermal gradient errors.

Figure 6:
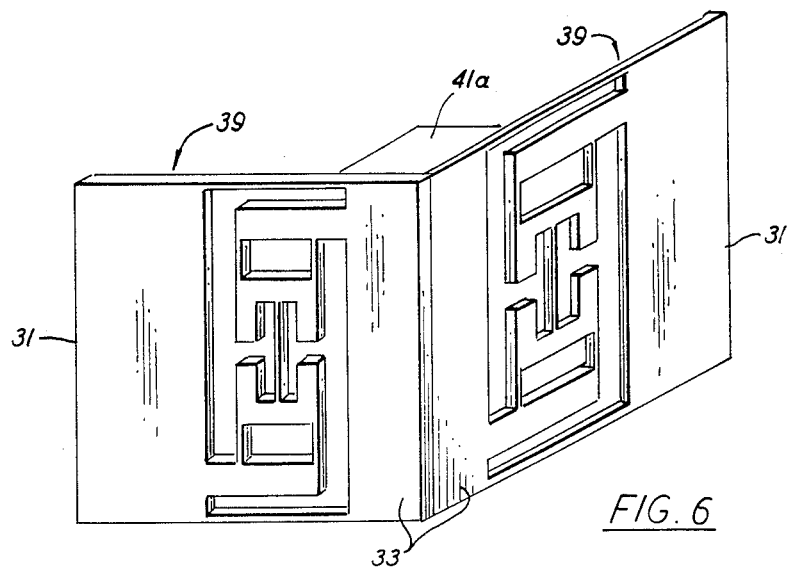
FIG. 6 is a perspective view illustrating an alternate embodiment of monolithic construction.

FIG. 6 illustrates an alternate form of the invention. The structures 39 are identical to those previously described. However, in this embodiment the two monolithic plates are positioned at right angles to each other with the proof mass 41a at the right angle joint between them, again, bonded to the mounting surfaces 33. The mounting surfaces 31 are then mounted to the housing or a spacer (not shown). This embodiment has the advantage that cross axis support is provided.

Figure 7:
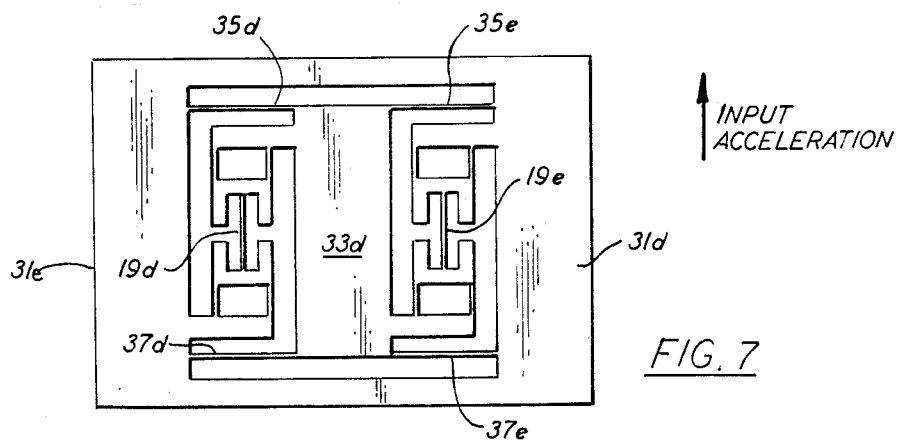
FIG. 7 is another form of construction of the monolithic dual beam resonator of the present invention.
Figure 8:
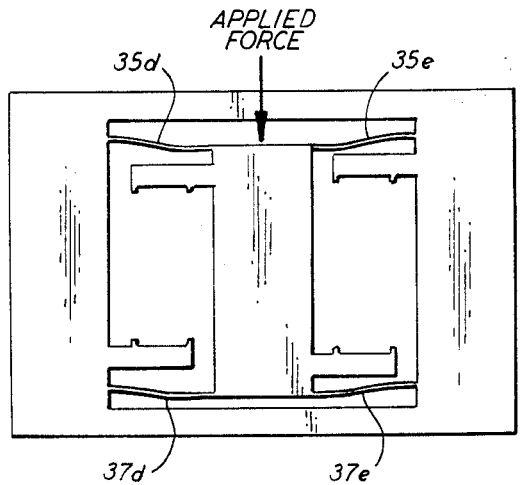
FIG. 8 is a view illustrating the manner in which deflection takes place with the monolithic structure of FIG. 7.

An embodiment of the present invention in which the dual beam monolithic resonator is constructed in one rather than two planar members is shown in FIGS. 7 and 8. Again, construction is quite similar to that of the previous FIGS. with respect to the beam isolator mass, isolator spring, etc. The difference here is that there is a single mounting surface 33d for the proof mass and a pair of mounting surfaces 31d and 31e for mounting of opposite sides to the housing or a spacer. The flexures 35d and 35e and 37d and 37e are illustrated. The action of these flexures under an applied force is illustrated by FIG. 8. It will be apparent from examination of FIGS. 7 and 8 that this will cause the beam 19d to be in compression and the beam 19e to be in tension.

Although in each case a double beam device has been described, it will be recognized that the structure of FIG. 2 can be used in a single beam device if desired.

What is claimed is:

1. A monolithic resonator and flexure structure for a vibrating beam accelerometer comprising:
   (a) a planar member of piezoelectric material having a first portion with a first mounting surface, a second portion with a second mounting surface spaced therefrom, and a vibrating beam disposed in an intermediate portion disposed between said first and second portions and respective mounting surfaces;
   (b) first and second flexures disposed at the top and bottom of said intermediate portion, coupling said first and second portions with the respective mounting surfaces; and
   (c) a first arm rigidly connected to said first portion and coupling said vibrating beam to said first portion with the first mounting surface at the top of said vibrating beam, and a second arm rigidly connected to said second portion and coupling said vibrating beam to said second portion with the second mounting surface at the bottom of said vibrating beam whereby relative movement of said first and second portions with respective mounting surfaces, permissible because of said first and second flexures, will cause said beam to be placed under compression or tension, depending on the relative direction of movement.

2. Apparatus according to claim 1 and further including a base, said first mounting surface rigidly connected to said base and a proof mass, said proof mass rigidly connected to said second mounted surface; and means for exciting said vibrating beam to oscillation.

3. Apparatus according to claim 2 and further including a second structure, the first mounting surface of said second structure rigidly connected to said proof mass and the second mounting surface rigidly connected to said base and means for exciting the beam in said second structure to vibration whereby when said proof mass is subjected to acceleration, one of said beams will be placed in tension and the other in compression.

4. Apparatus according to claim 3, wherein said first and second structures are disposed parallel to each other.

5. Apparatus according to claim 3, wherein said first and second structures are at right angles to each other.

6. Apparatus according to claim 3, and further including a damping plate connected to said base and spaced from said proof mass on each end thereof whereby with a gas between said damping plate and said proof mass gas film damping will take place.

7. Apparatus according to claim 6, and further including a casing and cover, said apparatus mounted within said casing with said base secured to said casing and said cover in place covering said casing, said cover sealed to said case and a damping gas filling said casing.

8. Apparatus according to claim 1, and further including a third mounting surface spaced from said second mounting surface, a second beam between said second mounting surface and third mounting surface, third and fourth flexures coupling said second and third mounting surfaces, a third arm at the top coupling said third mounting surface to said beam and a fourth arm at the bottom coupling said second mounting surface to said beam whereby a proof mass may be attached to said second mounting surface and said first and third mounting surfaces attached to a common base causing force applied to said proof mass to place one of said beams in compression and the other of said beams in tension.

9. Apparatus according to claim 2, 3 or 8 and further including between each of said arms and said beam, an isolator mass and isolator spring.

* * * * *